Dec. 6, 1955                R. B. EWELL                2,726,197
                      CATALYTIC CRACKING SYSTEM
                       Filed Sept. 24, 1952
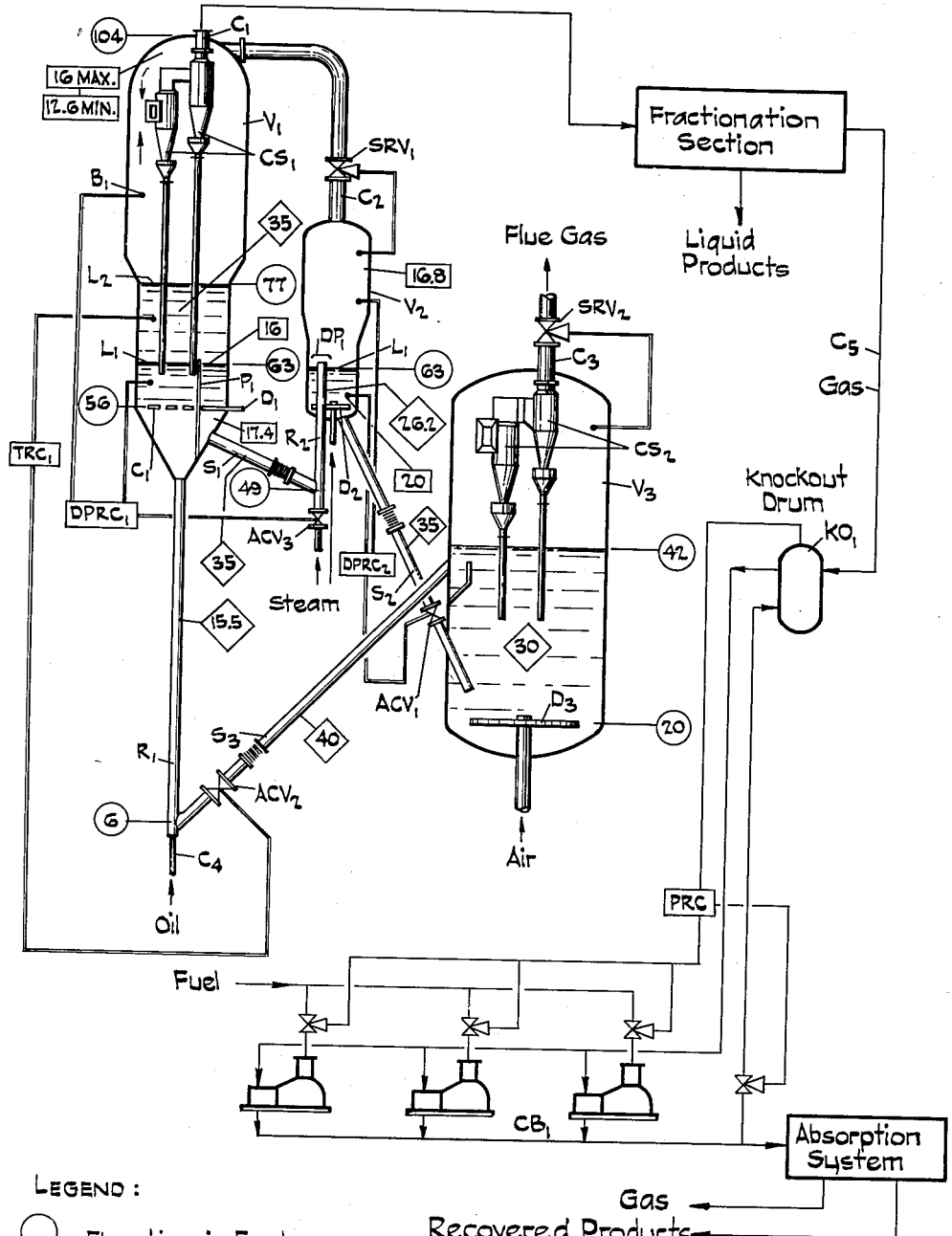

United States Patent Office 2,726,197
Patented Dec. 6, 1955

2,726,197
CATALYTIC CRACKING SYSTEM

Robert B. Ewell, Long Beach, Calif., assignor to Shell Development Company, Emeryville, Calif., a corporation of Delaware Application September 24, 1952, Serial No. 311,277
Claims priority, application Netherlands October 5, 1951
5 Claims. (Cl. 196—52)

This invention relates to a novel and useful system for the catalytic cracking of hydrocarbon oils with finely divided solid cracking catalyst which is continuously recycled through a cracking reaction vessel, a separate vessel for stripping occluded hydrocarbons from the spent catalyst, a separate regeneration vessel for burning carbonaceous deposits from the spent and stripped catalyst, and back to the said cracking reaction vessel. The invention also relates to the control of the flow of the catalyst in said system.

The object of the invention is to provide a novel and useful arrangement of the vessels, flows and controls which allows catalytic cracking to be carried out in an economical, efficient, and practical manner.

In the catalytic cracking of the hydrocarbon oils using the fluidized catalyst technique, the cracking catalyst in the form of a fine powder is circulated through a reaction zone where the cracking takes place under suitable conditions and through a separate regeneration zone where carbonaceous deposits are removed from the catalyst by burning with air. The regenerated catalyst is then recycled to the reaction zone. The amount of catalyst thus recycled is very large being anywhere from 5–20 times the amount of oil treated and is generally of the order of 20–30 tons per minute in large size plants. It is impractical to attempt to transport such quantities of hot catalyst by mechanical conveying means.

The catalyst flows through a closed circuit through the mentioned vessels. This is a system which has no positive acting prime mover and normally tends to be static. The large required recirculation rate is obtained by creating "hydrostatic" pressure heads and then utilizing the small head to attain the desired flow. The size of the artificially produced pressure heads is limited in practice by the limited maximum density of the fluidized catalyst and the limited velocities that can be applied in the transfer lines. The efficiency of any plant of this type, therefore, is greatly influenced by the efficiency with which these necessary pressure differences are created and the efficiency with which all available pressure differences are utilized. Since these factors are primarily determined by the sizes, shapes, and positions of the lines and vessels, these physical features are of utmost importance.

In the catalytic cracking of hydrocarbon oils utilizing the fluidized catalyst technique, one of the major problems encountered is in regenerating the catalyst. This regeneration is accomplished by burning carbonaceous deposits from the catalyst with air in a separate regeneration vessel. The spent catalyst is continuously supplied to the regeneration vessel and air is blown into the bottom of the vessel through a suitable distributor means to burn the carbonaceous deposits and to keep the bed of catalyst in a free flowing fluidized condition. The rate of burning of the carbonaceous deposits depends upon the rate at which air is introduced and also upon the amount of catalyst retained in the bed in the vessel. Since in catalytic cracking an appreciable percentage (e. g., 5–10%) of the oil treated is converted to carbonaceous matter which deposits on the catalyst and which must, therefore, be burned from the catalyst and, since the amount of oil treated is large, it will be seen that enormous quantities of carbonaceous deposits must be burned. Quantities of the order of 20,000 pound/hour are not uncommon.

In order to effect the regeneration, very large and heavy regenerators holding many tons of catalyst are required. Also, the power and the blowers required to pump the large amount of air into the regenerator for this regeneration are major items of expense in such operation.

The most economical operation of catalytic cracking units employing the fluidized catalyst technique, therefore, also requires the most economical regeneration of the catalyst. The regeneration vessel must be of a suitable size to handle the expected maximum regeneration load. Having been designed for this condition, the regenerator should be arranged to operate continuously and steadily under these optimum load conditions. Also, since the regeneration vessel is by far the largest and heaviest piece of equipment included, it should be supported at the lowest possible elevation. Also, it is important to the economy of the process that the regeneration load be lightened as far as possible by the application of efficient stripping of the spent catalyst before it is introduced into the regeneration zone.

In order to operate the regeneration under constant optimum load conditions, it is necessary to adjust the cracking conditions such that there is always a constant rate of production of carbonaceous deposits. This requires that the reactor be designed for considerable flexibility.

Taking as a premise a regenerator operating continuously under steady optimum conditions and a reactor designed to operate under varied conditions, it is evident that the system used to effect and control the catalyst circulation must be such that changes in the reaction conditions do not affect the regeneration conditions. This requires either that the regenerator be controlled to compensate for or modify any changes reflected upon change of the reaction conditions, or that the system be so arranged that any changes in the reaction conditions do not tend to affect the regeneration conditions.

In the development of the system of the invention, the various factors mentioned above have been taken into account. It has been found that by proper placing of the vessels and lines and by modification of the stripping arrangement and the arrangement of the controls, it is possible to combine the described desirable features in a practical plant.

This system and its operation will be described with reference to the accompanying drawing. The drawing illustrates the major apparatus of the system in essentially their correct relationships as to sizes and elevations. Also included are schematic representations of the control system and certain minor items of equipment. For purposes of illustration, a particular plant having a throughput capacity of 8,000 barrels/day, using the commercial synthetic silica alumina powdered cracking catalyst, has been chosen. Pertinent elevations, pressures, and densities for the particular plant are indicated. As those skilled in this art are aware, a system such as that illustrated is of necessity carefully balanced and must be considered as a whole.

It will be noted that the standpipes $S_1$ and $S_2$ are later described as being at approximately 45° from the vertical whereas in the drawing they appear to be at quite different angles. This is due to the fact that for the sake of simplicity the vessels are illustrated as lying in one plane and in this position it is impossible to draw all of the 45° standpipes at their proper angle while retaining the important differences in elevation.

Referring to the drawing, the cracking unit comprises a reaction-regeneration section, a fractionation section, and an absorption section. All catalytic cracking units comprise these three sections. In the present instance, it is necessary to refer briefly to all three sections since, as will be pointed out, part of the reaction section is controlled by the speed of the compressors in the absorption section.

The reaction-regeneration section comprises three main vessels, each of which defines a separate zone. These are a reaction vessel $V_1$, a stripping vessel $V_2$, and a regeneration vessel $V_3$. The three zones defined by these vessels are combined into a circulatory system by three standpipes (catastats) $S_1$, $S_2$ and $S_3$ and two riser lines $R_1$ and $R_2$.

The reactor is the most elevated of the three vessels. It extends from an elevation of 56 feet to an elevation of 104 feet. It is provided in its upper part (disengaging space) with internal two-stage cyclone separators $CS_1$ which discharge product vapors substantially free of catalyst to overhead conduit $C_1$ leading to the fractionation section. The cyclone separators are arranged in the conventional manner with dip legs for the return of separated catalyst to the lower part of the reaction zone.

The reaction vessel is mounted directly above a straight and vertical riser $R_1$ which discharges into the bottom of the reaction vessel. A suitable distributor means such as a perforated plate grid $G_1$ is mounted in the bottom of the reaction vessel directly above the riser outlet.

The whole system is designed to handle a variety of feedstocks under a variety of conditions. Thus, the system is designed such that the fluidized bed of catalyst in the reaction zone may be maintained at any desired level from an elevation of 63 feet (level $L_1$) to an elevation of 77 feet (level $L_2$). This represents well over a two-fold increase in contact without varying the rate of throughput of oil.

A partition $P_1$ extends from the bottom of the reaction vessel up to the level of the top of the fluidized bed of catalyst when the latter is at the minimum bed level $L_1$. The space to the right of this partition represents a small zone where preliminary stripping of the discharging catalyst is effected by steam injected through the pipe distributor $D_1$. No attempt is made to effect more than a very superficial removal of hydrocarbons from the catalyst at this point.

The stripping vessel is the vessel of second highest elevation and extends from a level of 50 feet up to approximately 80 feet (the exact height of the top is not critical). It is designed, however, so that the level of the fluidized bed during operation is constant and is substantially the same as the level of the bed of catalyst in the reaction zone when the latter is at the minimum (level $L_1$). The stripping vessel is fed through a straight and vertical riser $R_2$ which extends up through the bottom of the vessel to an elevation above the level $L_1$ of the fluidized bed. The catalyst entering the stripping vessel, therefore, enters in the disengaging space above the fluidized bed. A deflection plate $DP_1$ is provided above the outlet of the riser line to prevent the catalyst from being thrown to the top of the vessel. The riser $R_2$ is connected to the reaction vessel by the standpipe $S_1$ which is without valves or other flow control means and extends from the reaction vessel to the riser at an angle of approximately 45° from the vertical. Steam is injected into the riser in an amount which is controlled as later described. The stripping vessel is preferably provided in its upper part (disengaging space) with a cyclone separator (not shown) which is connected to the overhead discharge line conduit $C_2$. The provision of this cyclone separator is primarily a precautionary measure; even if it is provided, an efficient separation of catalyst cannot be expected. The vapor effluent line $C_2$ leads back to the disengaging space of the reactor. This is the most practical and desirable method of handling the stripper effluent since it allows the separation of catalyst to be effected by the efficient cyclone separators in the reaction vessel, and it obviates the need of a duplicate oil recovery system that would otherwise be needed. The particular arrangement shown has additional advantages which will be pointed out later. The stripper overhead line $C_2$ is provided with a set back pressure regulator valve $SRV_1$, the function of which will be described in more detail later.

As already pointed out, the unit is designed such that the level of fluidized catalyst in the stripper is retained constant at the level $L_1$ which is the level of the bed of fluidized catalyst in the reaction zone when the latter is operating at minimum bed level. The main stripping is carried out in the fluidized bed of catalyst thus maintained in the lower section of the stripping vessel. This stripping is effected by steam which is injected into the fluidized bed by the pipe distributor $D_2$.

The lowest vessel and the largest is the regeneration vessel. It extends from the elevation of 20 feet to about 63 feet (the level of the top is not critical). In the system in question this vessel is designed and arranged to operate continuously at optimum efficiency; it is operated with a constant level of fluidized catalyst and under constant conditions. The optimum level of fluidized bed is at 42 feet elevation. Stripped catalyst is fed to the regeneration vessel by the inclined standpipe $S_2$ which connects the bottom of the stripping vessel with the regeneration vessel at a point near the bottom thereof. This standpipe is also at approximately 45° from the vertical, and is provided with an automatically controlled valve $ACV_1$, the control of which will be later described. Air from a blower (not shown) is continuously provided through a pipe distributor $D_3$ in the bottom of the regeneration vessel. The regeneration vessel is likewise equipped with internal cyclone separators $CS_2$ which are provided with conventional dip legs and discharge the flue gas by overhead conduit $C_3$ containing the set back pressure regulator valve $SRV_2$. The arrangement is such that the blower operates continuously against its optimum head. This head is a function of both the depth of the fluidized bed in the regenerator (which is held constant), and the back pressure (which is also held constant). As will be evident later, the conditions of optimum blower head and constant maximum catalyst bed level allow the maximum continuous carbon burning rate; the other arrangements of the system are chosen to utilize this maximum carbon burning rate continuously and thereby obtain maximum plant throughput consistent with this burning rate.

The catalyst cycle is completed by the standpipe $S_3$ which connects the fluidized bed in the regenerator near the top to the riser line $R_1$. This standpipe is also approximately at 45° from the vertical. It is provided with an automatically controlled valve $C_2$ which operates as later described.

The apparatus described above constitutes the major vessels and flow lines of the reaction-regeneration section of the unit and provides for the all important circulation of the enormous quantities of catalyst involved. The oil to be cracked is introduced by conduit $C_4$. It is vaporized by contact with the hot regenerated catalyst from standpipe $S_3$ and the resulting vapors serve to transport the catalyst up through the riser $R_1$ to the reaction vessel. The cracked vapors after passing through the cyclone separators pass by line conduit $C_1$ into the fractionation section which, for the sake of simplicity, is shown simply as a box in the drawing. Here the vapors are cooled and fractionated into the normally liquid fractions of various desired boiling ranges and a gaseous fraction consisting largely of light paraffinic and olefinic hydrocarbon gases. The liquid fractions are separated and treated in the conventional manner while the gaseous fraction is passed by conduit $C_5$ to the absorption section of the unit. It is first necessary to compress the gaseous fraction to a pressure suitable for efficient absorption of the desired constituents. Thus the gas stream from the fractionation section entering by line $C_5$ is passed to a knock-out drum $KD_1$ and then to the compressor battery $CB_1$ where it is compressed and pumped to the absorption system indicated by the labelled block. This part of the system is conventional and, therefore, does not require further description.

The above brief description concerns only the physical arrangement of the main vessels and the more important lines. While these are of the utmost importance they do not of themselves define an operable system since the particular arrangement is operable only when controlled in the manner for which the arrangement was specifically designed.

As previously pointed out, one of the objects of the invention is to provide a more efficient and practical system in which the regeneration is carried out under constant optimum conditions. Thus, assuming a constant efficient stripping operation, the most costly operation, namely, the regeneration of the enormous amounts of catalyst involved, is carried out always under constant optimum maximum load conditions, and the cracking operation is adjusted to be in balance. This gives the maximum production capacity for the plant. As also pointed out, the amount of carbon to be burned, considering the constant efficient stripping provided, is determined by the characteristics of the feed stock and the severity of the cracking conditions. The amount of carbonaceous deposits formed is substantially independent of the pressure applied in the cracking step, at least in the narrow range of pressures here considered, but it is strongly dependent upon the contact time and the temperature of cracking. At any given feed rate the contact time is a function of the amount of catalyst in the reaction zone, i. e., of the depth of the catalyst bed, and the temperature is a function of the catalyst circulation rate (catalyst to oil ratio). There are, therefore, two primary controls necessary. In the system described the temperature in the reaction zone is governed and maintained at a constant set optimum value for the particular feed stock by temperature-recorder-controller $TRC_1$ which regulates the slide valve $ACV_2$ in response to changes in the temperature measured by a bulb $B_1$ in the fluidized bed of catalyst in the reaction zone. This arrangement has previously been applied commercially and is not new. The level of the fluidized bed of catalyst in the reaction zone, and hence the contact time, is adjusted for the particular feed and feed rate by addition or withdrawal of catalyst to or from the system by conventional means (not shown). As previously pointed out, the described design is very flexible and allows a wide variation in this respect. This optimum level, established as described, is maintained constant at the desired position by a differential-pressure-recorder-controller $DPRC_1$ which automatically and continuously measures the differential pressure between a point in the disengaging space of the reaction vessel and a point within the fluidized bed and controls a desired control means according to changes in the measured value. In the case in question this differential-pressure-recorder-controller is arranged to control valve $ACV_3$ which regulates the amount of stem entering the riser $R_2$. Thus, the optimum bed level is maintained constant by simple control of the flow of steam instead of control of a stream of catalyst. A steady and uniform control is, however, only possible by this means (without a valve in standpipe $S_1$) when the other conditions are not allowed to fluctuate appreciably. In other words, the pressures at the standpipe inlet and at the riser outlet should be substantially constant. This condition is provided in the described system by controlling the back pressures on the reactor effluent and on the stripper effluent to constant values. Thus the control of these back pressures are not responsive to changes in the levels of the catalyst beds or any other such variables other than changes in the desired pressure. This is accomplished by employing a simple and relatively trouble-free pressure regregardless of all other conditions. The back pressure ulating valve $SRV_1$ in the stripper effluent line. In the case in question this valve holds a constant pressure of 16.8 p. s. i. g. in the disengaging space in the stripper in the reaction vessel could also be maintained by such a valve in the reactor effluent line but this would be wasteful as it would create an unnecessary pressure drop. Such an unused pressure drop cannot be justified in systems of this kind where a pressure drop is equivalent to a hydrostatic head and where every pressure drop must be utilized as efficiently as possible. In the system described there is no such valve control and, consequently, no such wasted pressure drop. Instead the desired pressure is maintained constant by a regulator which controls the speed of the compressor battery in accordance with the suction pressure measured at any convenient location such as at the knock-out drum $KD_1$. By this arrangement, not only is the pressure in the upper space in the reaction vessel maintained constant at any desired set level but separate regulation of the compressors in accordance with variations in the quantity of gas produced in the system are automatically taken care of without any separate control arrangement to take care of this unrelated variable. In the system illustrated, this constant compressor intake pressure is set to afford a back pressure in the reaction vessel such that the total pressure (the sum of the back pressure and the hydrostatic pressure of the catalyst bed) is constant and uniform at the inlet to the standpipe $S_1$. In the particular case the pressure at the inlet to the standpipe $S_1$ is held constant at the desired pressure of 17.4 p. s. i. g. by setting the compressor speed controller. This then necessarily also creates a constant and uniform pressure at the top of the riser $R_1$. This control is illustrated diagrammatically. It may be effected by a number of arrangements of commercial control instruments as will be apparent to those skilled in the art. In one suitable arrangement, a conventional pressure-recorder-controller is connected to measure the pressure in the knock-out drum and to actuate a conventional engine speed controller in response thereto. The engine speed controller actuates the engine throttle to control the speed. As illustrated, the controller also is arranged to open a bypass line from the discharge back to the knock-out drum when the pressure in the knock-out drum tends to fall below a set minimum. This is to prevent stalling of the compressors, if reciprocal, or surging of the compressors, if centrifugal, during start up of the plant or during a major upset in the system.

As previously pointed out the back pressure valve in the stripper effluent line is independent of all other influences and simply maintains a constant pressure in the stripper disengaging space. The desired condition of constant pressure at the entrance and exit of this catalyst transfer operation are thus attained and this is so as long as the exit of the riser $R_2$ is above the upper level of the fluidized bed in the stripper as shown.

Slide valve $ACV_1$ is controlled by the differential-pressure-recorder-controller $DPRC_2$ which is responsive to differential pressure measured between a point in the disengaging space in the stripper and a point within the fluidized bed (i. e., changes in the height of the level bed) and automatically regulates valve $ACV_1$ to maintain the bed level constant at the indicated desired level. Since the bed level is maintained constant and the back pressure is also held constant, the pressure at the intake to the standpipe $S_2$ and at the intake to the control valve $ACV_1$ are also constant. This insures a constant safe and optimum differential pressure across the slide valve $ACV_1$. If this differential pressure is too large, the costly valve is quickly eroded and, if it is too small, there is great danger of back flow and explosion.

The height of the bed of catalyst in the regeneration vessel is not separately controlled by an automatic control but does not have more than minor freedom to fluctuate due to the controls imposed on the other vessels. Thus, this level can only vary through poor control by the instruments governing the levels in the reactor or stripper, or through inadvertent addition or loss of catalyst to or from the system. This is an advantage for it is found in practice that when it is tried to control all levels by automatic instruments, trouble is invariably encountered. For practical and trouble-free operation, at least one part of the system should be free of separate control and, therefore, able to absorb minor fluctuations in the conditions allowed by the remaining control instruments. In the system described the regeneration vessel with its large volume is allowed this minor freedom and it is the only major vessel allowed such freedom.

The result of the above arrangements is that the only variables to be adjusted are the catalyst inventory, the reaction temperature and the back pressure in the reaction vessel. The latter is set in accordance with the desired bed height and, after being set, is automatically retained constant.

The basic flows and controls have been described and illustrated. There remain certain additional features of the described and illustrated design that require mention.

It will be noted that all the standpipes shown are at an angle of about 45° from the vertical, whereas the riser lines are all vertical and straight. This is opposite to the usual practice. It has generally been thought that the maximum pressure head for a given difference in elevation is obtained in a vertical straight standpipe, and that bends or an inclination in the riser line where the velocities are higher are perfectly permissible. It is now found that in practical operation with plant size lines an equal or even larger pressure head is obtained in inclined standpipes and, on the other hand, it is found that bends or inclination in the riser lines generally lead to very erratic and unexpected density gradients in these lines which cause rough operation and generally entail pressure drops higher than expected. The angle of 45° is, of course, not critical. It is about optimum for convenient horizontal spacing of the vessels.

The spent catalyst being withdrawn from the catalyst bed in the reactor is withdrawn through the standpipe $S_1$ and then transferred into the disengaging space of the stripper through riser line $R_2$. This transfer is affected by the differences in densities in the standpipe and the riser line. Thus the density in the standpipe in the particular case in question is 35 pounds/cubic foot whereas the normal average in the riser line is 26.2 pounds/cubic foot. This difference in density is created and controlled by the steam introduced into the riser. All of this steam passes up through the riser with the catalyst into the stripper. This method of transfer allows smooth even operation with large lines having little resistance and with low linear velocities. Of equal or greater importance, however, this method of transferring the spent catalyst to the stripper is found to greatly improve the efficiency of the stripping.

It will be noted that the constant back pressure imposed on the stripper effluent is at least slightly greater than that imposed on the reactor effluent when the reactor is operating with the minimum bed level. As pointed out, the stripper effluent is passed to the disengaging space in the reactor and this has the mentioned advantages. A further point to be noted, however, is that the stripper effluent conduit $C_2$ is arranged to enter the reactor vessel at a point above the inlets of cyclone separators $CS_1$. The stripper gases consisting largely of steam are, therefore, required to pass downwardly to the cyclone inlets. This is a practical advantage since the stripper gas is utilized to continuously flush this otherwise relatively dead space above the cyclone separators. Without this arrangement, large masses of coke gradually accumulate in the space above the cyclone inlets. Large chunks of this coke break loose from time to time and frequently cause upsets in the operation of the system.

I claim as my invention:

1. In the catalytic cracking of a hydrocarbon oil, with a finely divided solid cracking catalyst wherein a substantially constant quantity of the catalyst is continuously recycled through a cracking zone, a separate stripping zone, a separate regeneration zone, and back through said reaction cracking zone, and a large part of the catalyst thus recirculated is maintained in each of said zones as a fluidized bed, the improvement which comprises establishing a desired level of fluidized catalyst bed in the reaction zone by adding or withdrawing catalyst to or from said quantity; maintaining said level constant in said reaction zone by automatically controlling the rate of withdrawal of spent catalyst from said bed in response to changes in the said level; establishing a back pressure on the vaporous effluent of said reaction zone in accordance with said level such that the pressure at the bottom of the bed is constant regardless of the chosen level; continuously maintaining said back pressure constant by controlling the rate of withdrawal of vaporous effluent from said reaction zone in response to changes in said back pressure; transporting spent catalyst withdrawn from said fluidized bed to a separate stripping zone in a stream of steam; automatically controlling the flow of said steam in response to changes in said mentioned level; maintaining a constant back pressure on the vaporous effluent of said stripping zone; maintaining a bed of fluidized catalyst in said stripping zone; maintaining the level of said latter bed constant by controlling the flow of catalyst withdrawn from said latter bed in response to changes in said latter level; passing catalyst withdrawn from said stripping zone to a separate regeneration zone and then back to the reaction zone to complete a catalyst cycle.

2. Process according to claim 1 in which the spent catalyst transported to the stripping zone is discharged in said stripping zone at a point above the level of the said fluidized bed in said zone.

3. Process according to claim 1 in which the back pressure maintained on the vaporous effluent of said stripping zone is greater than the back pressure maintained on the vaporous effluent of said reaction zone and the vaporous effluent of said stripping zone is passed to the said reaction zone entering at a point above the said fluidized bed therein.

4. Process according to claim 1 in which the vaporous effluent from said reaction zone is compressed to a higher pressure and the said back pressure is maintained constant at a set value by automatically controlling the rate of compression in response to changes in the said back pressure.

5. In a fluidized catalyst catalytic cracking system having separate reaction, stripping and regeneration vessels interconnected with suitable conduits for recirculation of catalyst serially through said vessels, the combination of an elevated reaction vessel, a vapor outlet conduit connecting the upper part of said vessel with gas compression means, an automatic regulator arranged to maintain a constant fixed back pressure in said conduit by regulating the compression rate of said compression means in response to changes in said back pressure independent of all other variables, a stripping vessel of lower elevation, an open unrestricted catalyst standpipe and associated riser line connecting the lower part of said reactor vessel with said stripper vessel and adapted to transfer spent catalyst from the former to the latter vessel, a conduit connecting the top of said stripping vessel with the top of said reaction vessel, a control valve in said latter conduit, and an automatic control means arranged to actuate said control valve.

References Cited in the file of this patent

UNITED STATES PATENTS

| | | |
|---|---|---|
| 2,420,129 | Flock et al. | May 6, 1947 |
| 2,422,793 | McAfee | June 24, 1947 |
| 2,465,255 | Moorman | Mar. 22, 1949 |
| 2,584,738 | Beam | Feb. 5, 1952 |
| 2,589,862 | Putney | Mar. 18, 1952 |